(12) United States Patent
Hwang

(10) Patent No.: US 10,723,001 B2
(45) Date of Patent: Jul. 28, 2020

(54) BALL LOCKING WELD NUT CLAMP

(71) Applicant: GM GLOBAL TECHNOLOGY OPERATIONS LLC, Detroit, MI (US)

(72) Inventor: Dooil Hwang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 162 days.

(21) Appl. No.: 15/955,024

(22) Filed: Apr. 17, 2018

(65) Prior Publication Data

US 2019/0314958 A1  Oct. 17, 2019

(51) Int. Cl.
*B25B 5/08* (2006.01)
*B23B 31/107* (2006.01)

(52) U.S. Cl.
CPC ............ *B25B 5/087* (2013.01); *B23B 31/107* (2013.01); *B23B 31/1071* (2013.01); *Y10S 411/964* (2013.01)

(58) Field of Classification Search
CPC ..... Y10S 411/964; B25B 5/087; B25B 5/061; B25B 5/062; B25B 5/08; B23B 31/107; B23B 31/1071; B23B 31/4006
See application file for complete search history.

(56) References Cited

U.S. PATENT DOCUMENTS

| | | | | |
|---|---|---|---|---|
| 2,298,552 A * | 10/1942 | Du Vall | ................. | F16B 29/00 411/59 |
| 2,968,205 A * | 1/1961 | Springate | .............. | F16B 21/165 411/348 |
| 2,983,978 A * | 5/1961 | Wilgus | ................. | F16B 21/165 411/555 |
| 3,085,462 A * | 4/1963 | Myers | .................. | F16B 21/165 411/348 |
| 5,207,544 A * | 5/1993 | Yamamoto | .......... | B60R 21/2035 411/348 |
| 5,845,898 A * | 12/1998 | Halder | ................. | F16B 5/0628 269/48.1 |
| 7,125,058 B2 * | 10/2006 | Hawthorne | ......... | E05B 47/0002 294/82.28 |
| 9,194,410 B2 * | 11/2015 | Davies | ................. | F16B 21/165 |
| 2002/0071738 A1 * | 6/2002 | Choate | ............... | A62B 35/0068 411/348 |

* cited by examiner

*Primary Examiner* — Tyrone V Hall, Jr.

(57) ABSTRACT

A multi-stage tooling pin clamp capable of holding weld nuts of different sizes includes a housing having a proximal end, a distal end, and a plurality of longitudinal stages extending between the proximal and distal ends. A plunging pin within the housing and includes a plurality of tapered surfaces configured to radially displace at least one locking ball ring assembly disposed in at least one of the plurality of longitudinal stages of the housing. An actuating mechanism is in communication with the plunging pin configured to move the plunging pin toward the distal end of the housing to displace the at least one locking ball ring assembly radially outward to hold the weld nut, and a restoring mechanism in communication with the plunging pin configured to move the plunging pin toward the proximal end of the housing to release the hold on the weld nut.

14 Claims, 3 Drawing Sheets

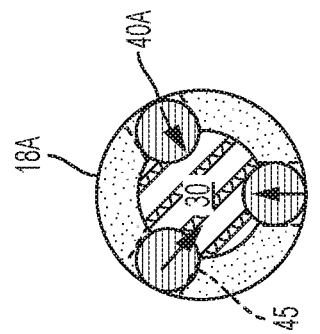
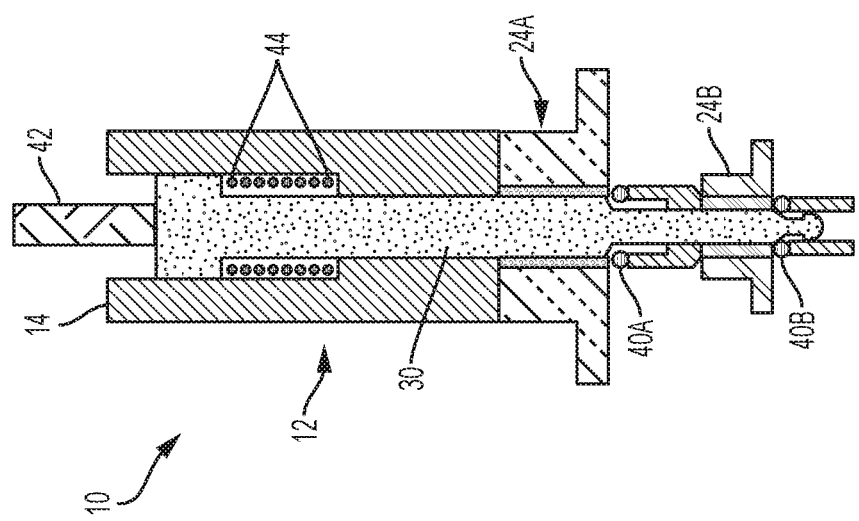

BALL LOCKING WELD NUT CLAMP

TECHNICAL FIELD

This disclosure relates to a tooling pin clamp, and more particularly, to a ball locking weld nut clamp for locking weld nuts of different sizes.

BACKGROUND

A manufacturing system typically operates on parts, sub-assemblies, and/or assemblies that must be accurately located and held in place for manufacturing and assembly operations. For example, a sheet metal part, subassembly, or assembly may need to be accurately located and held in place to conduct assembly, welding, and inspection operations in the body shop of a vehicle assembly plant.

Part locating fixtures are normally used for this purpose. Part locating fixtures typically include a plurality of fixed pins that are configured to fit into a plurality of locating holes in the part and one or more clamps that are configured hold the part in place. The locating holes may have various sizes and/or shapes. Part locating fixtures are generally useable for only one particular part size and/or shape and usually need to be modified or rebuilt to locate and hold a differently sized and/or shaped part.

Multiple part locating fixtures are typically required for the wide variety of parts and the wide variety of assembly and manufacturing operations in a manufacturing plant.

SUMMARY

One or more exemplary embodiments described herein provide a multi-stage tooling pin clamp capable of holding weld nuts of different sizes.

In accordance with aspects of one exemplary embodiment, the multi-stage tooling pin clamp includes a housing having a proximal end, a distal end, and a plurality of longitudinal stages extending between the proximal and distal ends wherein at least one of the plurality of longitudinal stages has a predetermined diameter marginally smaller than an internal diameter of at least one weld nut.

Another aspects includes a plunging pin disposed within the housing having a plurality of tapered surfaces configured to radially displace at least one locking ball ring assembly disposed in at least one of the plurality of longitudinal stages of the housing.

And another aspect includes an actuating mechanism in communication with the plunging pin configured to move the plunging pin toward the distal end of the housing to displace the at least one locking ball ring assembly radially outward beyond the internal diameter of the at least one weld nut to hold the at least one weld nut on the at least one of the plurality of longitudinal stages.

And still another aspect includes a restoring mechanism in communication with the plunging pin configured to move the plunging pin toward the proximal end of the housing to allow the at least one locking ball ring assembly to retract radially inward to release the hold on the at least one weld nut when the actuating mechanism withdraws.

Further aspects in accordance with the exemplary embodiment are included wherein at least one of the plurality of longitudinal stages has a predetermined diameter marginally smaller than a M8 weld nut, and wherein at least one of the plurality of longitudinal stages has a predetermined diameter marginally smaller than a M6 weld nut.

And another aspect wherein the at least one locking ball ring assembly includes three locking balls spaced 120 degrees apart in the at least one of the plurality of longitudinal stages.

Still other aspects wherein the actuating mechanism is an electromagnetic actuator or wherein the actuating mechanism is a pneumatic actuator.

And yet one other aspect wherein the restoring mechanism is a compressed spring.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein:

FIG. 4A is a cross-sectional illustration of the multi-stage tooling pin clamp in a pre-actuated or release state in accordance with aspects of the exemplary embodiment; and FIG. 4B is an illustration of a distal end view of the multi-stage tooling pin clamp of FIG. 4A in the pre-actuated or release state in accordance with aspects of the exemplary embodiment.

DETAILED DESCRIPTION

Figure 1B:
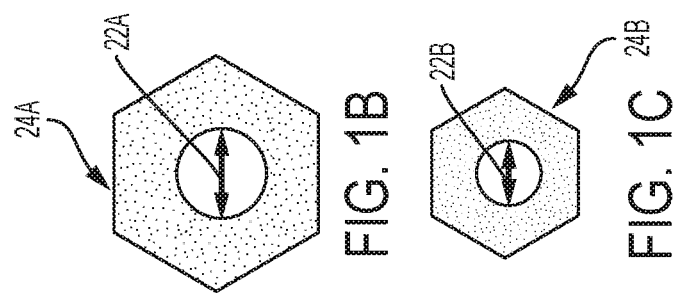
FIGS. 1B & 1C are exemplary illustrations of varying internal diameters of weld nuts.
Figure 1C:
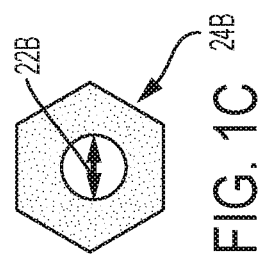
Figure 1A:
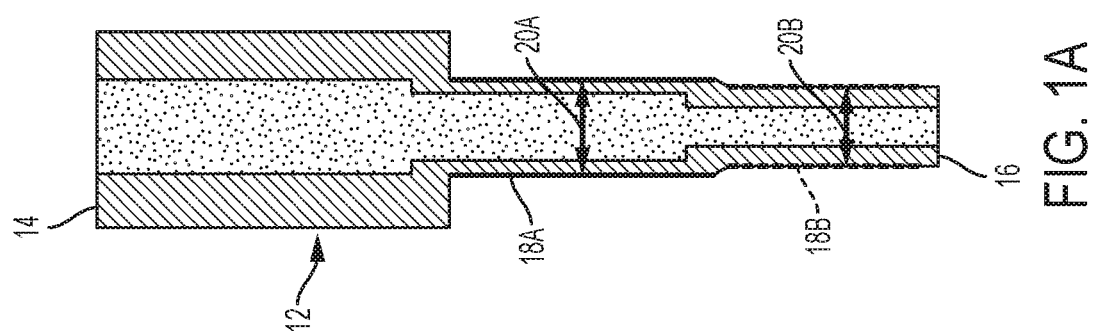
FIG. 1A is an illustration of the multi-stage tooling pin clamp housing in accordance with aspects of an exemplary embodiment.

Referring to the drawings, wherein like reference numbers refer to like components throughout the views, FIG. 1A is an illustration of the multi-stage tooling pin clamp housing 12 in accordance with aspects of an exemplary embodiment. The housing 12 includes a proximal end 14, a distal end 16, and a plurality of longitudinal stages (18A, 18B) extending between the proximal and distal ends (14, 16) wherein at least one of the plurality of longitudinal stages (18A, 18B) has a predetermined diameter (20A, 20B) marginally smaller than an internal diameter (22A, 22B) of at least one weld nut (24A, 24B) with reference to FIGS. 1B and 1C. Although the multi-stage tooling pin clamp 10 illustrates only two longitudinal stages as the exemplary embodiment, it is understood that additional longitudinal stages can be provided to the multi-stage tooling pin clamp 10 without exceeding the scope of this disclosure.

In one embodiment the multi-stage tooling pin clamp 10 in at least two longitudinal stages wherein at least one stage has a predetermined diameter marginally smaller than a M8 weld nut, and wherein at least one stage has a predetermined diameter marginally smaller than a M6 weld nut. The housing 12 may be formed of a molded material, such a thermoplastic, metal alloy or other material suitable for such purpose.

Figure 2:
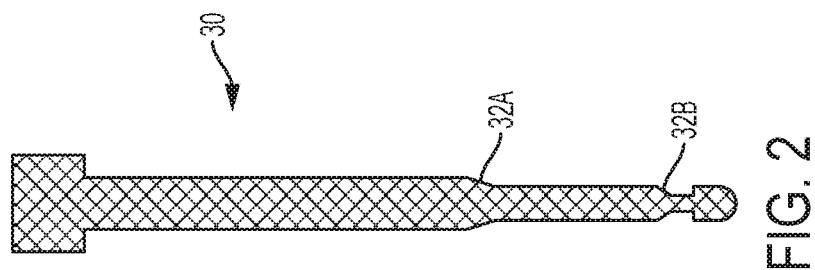
FIG. 2 is an illustration of a plunging pin for the multi-stage tooling pin clamp in accordance with aspects of the exemplary embodiment.
Figure 3B:
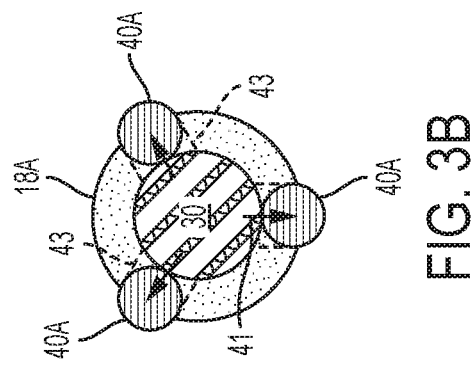
FIG. 3B is an illustration of a distal end view of the multi-stage tooling pin clamp of FIG. 3A in an actuated state in accordance with aspects of the exemplary embodiment.
Figure 3A:
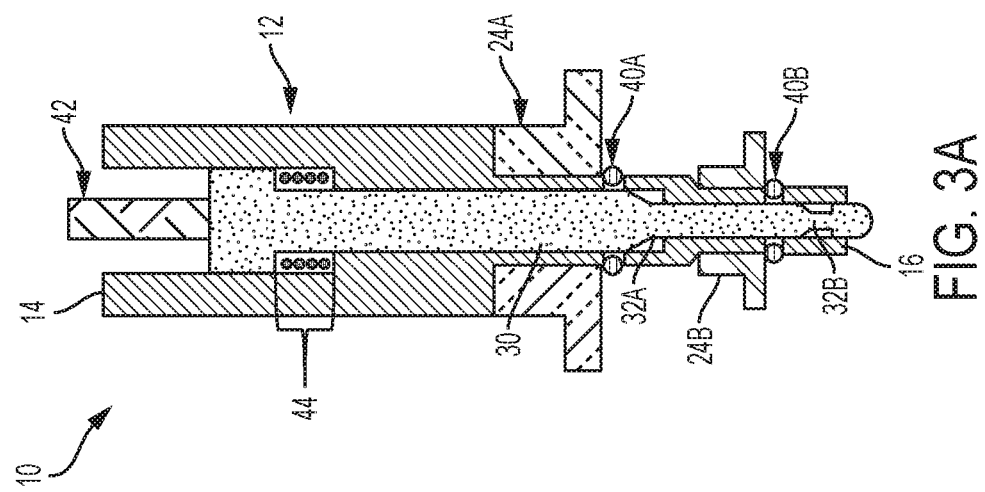
FIG. 3A is a cross-sectional illustration of the multi-stage tooling pin clamp in an actuated state in accordance with aspects of the exemplary embodiment.

Referring now to FIG. 2 and FIG. 3A, an illustration of a plunging pin 30 for the multi-stage tooling pin clamp 10 in accordance with aspects of the exemplary embodiment is provided. The plunging pin 30 includes a plurality of tapered surfaces (32A, 32B) configured to radially displace at least one locking ball ring assembly (40A, 40B) disposed in at least one of the plurality of longitudinal stages (18A, 18B) of the housing 12. In addition the housing 12, the plunging pin 30 may likewise be formed of a molded material, such a thermoplastic, metal alloy or other material suitable for such purpose. It is appreciated that the plunging pin 30 is of shape and dimension such that it can slide ably displaced in the housing 12 between the proximal and distal ends (14, 16) under sufficient physical persuasion.

Referring now to FIGS. 3A and 3B, cross-sectional illustrations of the multi-stage tooling pin clamp 10 in an actuated state (FIG. 3A), and a distal end view (FIG. 3B) of the multi-stage tooling pin clamp 10 in the actuated state are provided in accordance with aspects of the exemplary embodiment. An actuating mechanism 42 in communication with the plunging pin 30 is configured to move the plunging pin 30 toward the distal end 16 of the housing 12 to cause displacement the at least one locking ball ring assembly (40A, 40B) radially outward beyond the internal diameter (22A, 22B) of the at least one weld nut (24A, 24B) to hold the at least one weld nut (24A, 24B) on the at least one of the plurality of longitudinal stages (18A, 18B). The actuating mechanism 42 may be provided as an electromagnetic, pneumatic, or other type of actuator suitable for the intended purpose of urging the plunging pin 30 toward the distal end 16 of the housing 12.

Referring to FIG. 3B, the at least one locking ball ring assembly 40A is forced radially outward by the plunging pin 30 in expansion channels 43 in the direction 41 beyond the length of the internal diameter 22A of the at least one weld nut 24A such that the at least one weld nut 24A is clamped or held on the multi-stage tooling pin clamp 10.

Additionally, referencing FIGS. 3A, 4A, and 4B, restoring mechanism 44 in communication with the plunging pin 30 is configured to move the plunging pin 30 toward the proximal end 14 of the housing 12 to allow the at least one locking ball ring assembly (40A, 40B) to retract radially inward in the direction 45 to release the hold on the at least one weld nut 24A when the actuating mechanism 42 releases/withdraws. The restoring mechanism 44 may be a spring that becomes compressed when the multi-stage tooling pin clamp 10 is actuated. The energy stored in the compressed spring is sufficient to restore the plunging pin 30 back to the pre-actuated/release state such that the at least one weld nut (24A, 24B) will no longer be clamped or held on the multi-stage tooling pin clamp 10.

While the best modes for carrying out the many aspects of the present teachings have been described in detail, those familiar with the art to which these teachings relate will recognize various alternative aspects for practicing the present teachings that are within the scope of the appended claims.

What is claimed is:

1. A multi-stage tooling pin clamp system capable of holding weld nuts of different sizes, comprising:
   at least one weld nut;
   a housing having a proximal end, a distal end, and a plurality of longitudinal stages extending between the proximal and distal ends wherein at least one of the plurality of longitudinal stages has a predetermined diameter marginally smaller than an internal diameter of the at least one weld nut;
   a plunging pin disposed within the housing having a plurality of tapered surfaces configured to radially displace at least one locking ball ring assembly disposed in at least one of the plurality of longitudinal stages of the housing;
   an actuating mechanism in communication with the plunging pin configured to move the plunging pin toward the distal end of the housing to displace the at least one locking ball ring assembly radially outward beyond the internal diameter of the at least one weld nut to hold the at least one weld nut on the at least one of the plurality of longitudinal stages; and
   a restoring mechanism in communication with the plunging pin configured to move the plunging pin toward the proximal end of the housing to allow the at least one locking ball ring assembly to retract radially inward to release the hold on the at least one weld nut when the actuating mechanism withdraws.

2. The tooling pin clamp system of claim 1 wherein at least one of the plurality of longitudinal stages has a predetermined diameter marginally smaller than a M8 weld nut.

3. The tooling pin clamp system of claim 1 wherein at least one of the plurality of longitudinal stages has a predetermined diameter marginally smaller than a M6 weld nut.

4. The tooling pin clamp system of claim 1 wherein the at least one locking ball ring assembly comprises three locking balls spaced 120 degrees apart in the at least one of the plurality of longitudinal stages.

5. The tooling pin clamp system of claim 1 wherein the actuating mechanism is an electromagnetic actuator.

6. The tooling pin clamp system of claim 1 wherein the actuating mechanism is a pneumatic actuator.

7. The tooling pin clamp system of claim 1 wherein the restoring mechanism is a spring.

8. A multi-stage tooling pin clamp system capable of holding weld nuts of different sizes, comprising:
   at least one weld nut;
   a housing having a proximal end, a distal end, and a plurality of longitudinal stages extending between the proximal and distal ends wherein at least one of the plurality of longitudinal stages has a predetermined diameter marginally smaller than an internal diameter of the at least one weld nut;
   a plunging pin disposed within the housing having a plurality of tapered surfaces configured to displace at least one locking ball ring assembly disposed in at least one of the plurality of longitudinal stages of the housing;
   an actuating mechanism in communication with the plunging pin configured to move the plunging pin toward the distal end of the housing to displace the at least one locking ball ring assembly radially outward beyond the internal diameter of the at least one weld nut to hold the at least one weld nut on the at least one of the plurality of longitudinal stages; and
   a compressed spring in communication with the plunging pin configured to move the plunging pin toward the proximal end of the housing to allow the at least one locking ball ring assembly to retract radially inward to release the hold on the at least one weld nut when the actuating mechanism withdraws.

9. The tooling pin clamp system of claim 8 wherein at least one of the plurality of longitudinal stages has a predetermined diameter marginally smaller than a M8 weld nut.

10. The tooling pin clamp system of claim 8 wherein at least one of the plurality of longitudinal stages has a predetermined diameter marginally smaller than a M6 weld nut.

11. The tooling pin clamp system of claim 8 wherein the at least one locking ball ring assembly comprises three locking balls spaced 120 degrees apart in the at least one of the plurality of longitudinal stages.

12. The tooling pin clamp system of claim 8 wherein the actuating mechanism is an electromagnetic actuator.

13. The tooling pin clamp system of claim 8 wherein the actuating mechanism is a pneumatic actuator.

14. A multi-stage tooling pin clamp system capable of holding weld nuts of different sizes, the system comprising:
- at least one weld nut;
- a housing having a proximal end, a distal end having an opening extending through the proximal end, and a plurality of longitudinal stages extending between the proximal and distal ends wherein at least one of the plurality of longitudinal stages has a predetermined diameter marginally smaller than an internal diameter of the at least one weld nut;
- a plunging pin disposed within the housing having a plurality of tapered surfaces configured to radially displace at least one locking ball ring assembly disposed in at least one of the plurality of longitudinal stages of the housing;
- an actuating mechanism in communication with the plunging pin configured to move the plunging pin through the distal end of the housing to displace the at least one locking ball ring assembly radially outward beyond the internal diameter of the at least one weld nut to hold the at least one weld nut on the at least one of the plurality of longitudinal stages; and
- a restoring mechanism in communication with the plunging pin configured to move the plunging pin toward the proximal end of the housing to allow the at least one locking ball ring assembly to retract radially inward to release the hold on the at least one weld nut when the actuating mechanism withdraws.

\* \* \* \* \*